(12) United States Patent  
Willeke et al.

(10) Patent No.: US 8,579,480 B2  
(45) Date of Patent: Nov. 12, 2013

(54) LED LANDING LIGHT ARRANGEMENT FOR AN AIRCRAFT

(75) Inventors: Benjamin Willeke, Salzkotten (DE); Enrico Beier, Lippstadt (DE); Alexander Wernicke, Lippstadt (DE); Andre Hessling, Koblenz (DE)

(73) Assignee: Goodrich Lighting Systems GmbH (DE)

( * ) Notice: Subject to any disclaimer, the term of this patent is extended or adjusted under 35 U.S.C. 154(b) by 29 days.

(21) Appl. No.: 13/238,427

(22) Filed: Sep. 21, 2011

(65) Prior Publication Data

US 2012/0069589 A1    Mar. 22, 2012

(30) Foreign Application Priority Data

Sep. 22, 2010   (EP) ..................................... 10178284

(51) Int. Cl.
*B64D 45/08* (2006.01)
*B64D 47/04* (2006.01)

(52) U.S. Cl.
USPC .......................................... 362/470; 362/540

(58) Field of Classification Search
USPC .......... 362/470, 472, 540; 340/945, 981, 982, 340/815.45
See application file for complete search history.

(56) References Cited

U.S. PATENT DOCUMENTS

| | | | |
|---|---|---|---|
| 6,244,728 B1 * | 6/2001 | Cote et al. | 362/249.06 |
| 6,669,357 B2 * | 12/2003 | Konicke et al. | 362/470 |
| 6,984,061 B1 * | 1/2006 | Soderberg et al. | 362/470 |
| 8,192,060 B2 * | 6/2012 | Wilkinson et al. | 362/470 |
| 2005/0093718 A1 | 5/2005 | Martin | |
| 2008/0137353 A1 * | 6/2008 | Larsen et al. | 362/470 |
| 2011/0122635 A1 * | 5/2011 | Calvin et al. | 362/470 |

FOREIGN PATENT DOCUMENTS

GB            601079         4/1948

* cited by examiner

Primary Examiner — Peggy A. Neils
(74) Attorney, Agent, or Firm — Cantor Colburn LLP

(57) ABSTRACT

An LED landing light arrangement for an aircraft comprises a plurality of LED light sources (12,14,16) for arrangement on an aircraft (24), primarily on the wing roots (20), on the front edges of the wings (22) and/or on the landing gears (18). The LED light sources (12,14,16) are operative to generate, relative to the central axis of the aircraft (24), a light distribution (10) ahead of the aircraft (24) that is spread substantially in a Y-shaped configuration in an obliquely downward direction. The light distribution (10) comprises two converging lateral regions (34,36) arranged laterally ahead of the aircraft (24), and a central region (40) running from said converging lateral regions (34,36) along an extension of said central axis and oriented in a direction away from the aircraft (24).

4 Claims, 3 Drawing Sheets

LED LANDING LIGHT ARRANGEMENT FOR AN AIRCRAFT

RELATED CROSS-REFERENCING

The present invention claims the priority of European Patent Application EP 10 178 284.4 filed on Sep. 22, 2010, the disclosure of which is incorporated herein by reference.

BACKGROUND OF THE INVENTION

1. Field of the Invention

The invention relates to an LED landing light arrangement for an aircraft with improved illumination of the regions laterally of the cockpit and in front of the cockpit during the aircraft's landing approach, touchdown and rolling movement on the landing strip, on the taxiway and on the field in front of the terminal. The LED landing light arrangement of the invention improves the safety and the comfort for the pilot of the aircraft as well as the visibility of the aircraft to persons external of the aircraft.

2. Description of the Prior Art

Aircraft presently in service are provided with landing lights which are used during the landing approach of the aircraft and are arranged in the wing roots and on the front landing gear (see e.g. US-A-2008/0137353 and GB-A-601079). After touchdown of the aircraft and during taxi of the aircraft on the ground, the effect of the landing lights is supported by turn-off and taxi lights which have a wide light distribution to the front and to the sides. Due to their orientation and performance, turn-off and taxi lights allow for views in lateral directions only during the taxiing of the aircraft on the ground. Thus, these lights are not suited to enlarge or improve the pilot's illuminated field of view during the landing approach.

At present, there exist substantially two types of landing lights, namely so-called HID and "sealed beam" lights. Both types of landing lights have a relatively narrow rotationally symmetric light distribution which is appropriately oriented in the direction of the touch-down point of the aircraft on the landing strip. Meanwhile, however, there have been introduced first types of LED landing lights which produce the same light patterns as the above mentioned two types of landing lights. In landing lights of the types currently in use, however, relatively much light will be wasted as stray light, which is caused by shading and insufficient intensity. Further, HID landing lights cannot be used for offering the pilot an obliquely downward view of the ground. The narrow light strips generate a "finger" effect with high differences in the illuminating light, which, due to the lateral-angle and elevation-angle variations of the aircraft during the landing approach, has the consequence that the illuminated areas will "dance" on the ground, so that no all-inclusive illumination of the landing strip will be possible.

A difference has to be made between, on the one hand, landing light arrangements whose light is directed onto the ground during the landing approach of the aircraft, and, on the other hand, navigation or position lights as described e.g. in US-A-2005/0093718.

It is an object of the invention to render it possible, by use of simple means, to reliably illuminate the area which is relevant to the pilot during the landing approach, i.e. the area in front of the cockpit and to both sides of the cockpit.

SUMMARY OF THE INVENTION

According to the invention, the above object is achieved by an LED landing light arrangement for an aircraft, said LED landing light arrangement comprising a plurality of LED light sources for arrangement on an aircraft, primarily on the wing roots, on the front edges of the wings and/or on the landing gears, said LED light sources are, during the landing approach, operative to generate, relative to the central axis of the aircraft, a light distribution ahead of the aircraft that is spread substantially in a Y-shaped configuration in an obliquely downward direction, said light distribution comprising two converging lateral regions arranged laterally ahead of the aircraft, and a central region running from said converging lateral regions along an extension of said central axis and oriented in a direction away from the aircraft.

According to a preferred embodiment of the invention, it is provided that the two lateral regions of the light distribution are curved relative to the front end of the fuselage of the aircraft, the central region running from a common central region of the two lateral regions while laterally widening along an extension of the central axis, and in a direction away from the aircraft.

According to a further preferred embodiment of the invention, it is provided that said light distribution spread substantially in a Y-shape extends across a first lateral-angle region (2 times $\beta$) between 60° and 100° which is symmetric to the central axis of the aircraft 31, and/or within a distance from the aircraft of at least 15 m up to maximally 150 m and across a symmetric second lateral-angle region (2 times $\alpha$) between 0° and 20° which is also symmetric to the central axis of the aircraft 31 and extending a distance from the aircraft of at least 30 m up to maximally 1000 m.

According to a still further preferred embodiment of the invention, it can be provided that said light distribution spread substantially in a Y-shape is oriented, relative to the horizontal plane, downward by a height angle between 5° and 20° and extends within lateral-angle region of 5° to 20°.

BRIEF DESCRIPTION OF THE DRAWINGS

A full and enabling disclosure of the present invention, including the best mode thereof, enabling one of ordinary skill in the art to carry out the invention, is set forth in greater detail in the following description, including reference to the accompanying drawing in which.

DETAILED DESCRIPTION OF PREFERRED EMBODIMENTS

Figure 1:
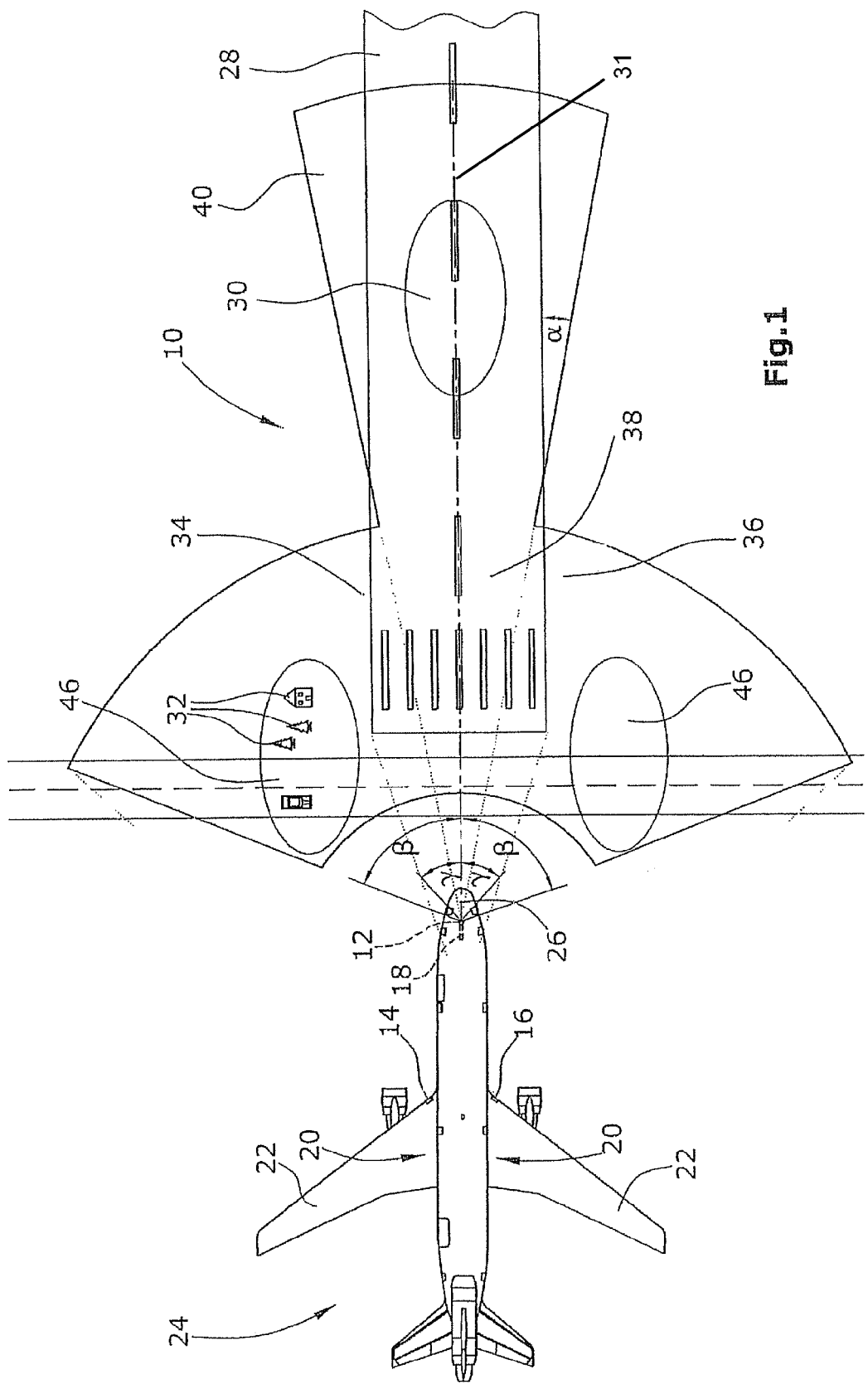
FIG. 1 is a top plan view of an aircraft during landing approach, showing a graphical representation of the inventive light distribution for illumination of the regions laterally of the landing strip and of the landing strip itself, and particularly of the region of the landing strip in front of and behind the intended landing site.

The invention is based on the idea of using a dedicated, non-rotationally-symmetric light distribution which is particularly enhanced by the use of LEDs, wherein, with the aid of this light distribution, the pilot's field of view during landing approach can be used to a distinctly larger extent by improving its illumination. According to the invention, the light distribution has a spread shape resembling that of the letter Y, with the two arms of said Y-shape, diverging from the "shaft" of the Y, being arranged laterally of the cockpit of the aircraft and converging in front of the cockpit. LEDs and particularly LED clusters are well-suited for realizing the different orientations of light sources of a light device relative to each other, and thus allow for simple adjustment to the desired light distribution.

The light flux emitted by LED lights, when considered in relation to the size of the area to be illuminated, is relatively limited. For this reason, no portion of the emitted light should remain unused; further, the illumination ratio of the various regions relative to each other should be well-adjusted. This finally leads to the inventive Y-shaped branched light distribution in the region ahead of the aircraft, said region being oriented obliquely downward.

Within the light distribution according to the invention, there can be suitably provided an accentuated reference point for the pilot, which illuminates the intended touchdown point of the aircraft and gives assistance to the pilot when maneuvering the aircraft in the final phase of the landing approach. Throughout the illuminated region, the contrast ratios should be small so as to guarantee a homogeneous, substantially uniform illumination also during a more turbulent landing approach.

The inventive dedicated lateral illumination during the landing approach, which in regard to its size is adapted to the peripheral field of view of the pilot, has an illumination intensity which allows for quick visual perception of reference objects without brightness adaptation of the eye. Thus, the illumination intensity between the lateral focal areas of the light and the central, forwardly directed focal area of the light should have a contrast of less than 1:15 within the defined illuminated areas.

Reference point appearing in an obliquely downward view of the ground can be houses, trees or other objects which, since they are now illuminated due to the inventive light distribution, will enable the pilot to estimate height, distance and speed. An illumination only in forward direction, using a narrow light cone reaching to about 300 m or more, as commonly practiced according to the present state of the art, does not offer such a possibility.

The lateral illuminated areas should have a "depth" selected with regard to the landing speed of the aircraft, thus guaranteeing a sufficiently long-lasting illumination time of the objects for convenient perception of such objects by the pilot. Further, lateral illumination within a larger spatial angle will enhance the visibility of the aircraft for non-involved third parties.

In FIG. 1, the substantially Y-shaped spread light distribution 10 of the invention is illustrated in plan view. This light distribution is generated by LED light sources 12, 14 and 16 which in this exemplary embodiment are arranged on the nose landing gear 18 and respectively in the roots 20 of the wings 22 of an aircraft 24. By the light distribution 10, the pilot looking out of the cockpit 26 will be able to observe an illuminated lateral field of view and an illuminated forward field of view onto the landing strip 28. Thus, the landing zone 30 is well-illuminated wherein, additionally, reference objects 32 in the lateral regions are illuminated.

The substantially Y-shaped spread light distribution 10 of the invention comprises two lateral regions 34,36 forming the two upward arms of the bifurcation of the letter Y. Extending from the central portion 38 of the two lateral regions 34,36 is the central region 40 of the light distribution 10 which can widen on both sides with increasing distance from the aircraft 24.

Figure 2:
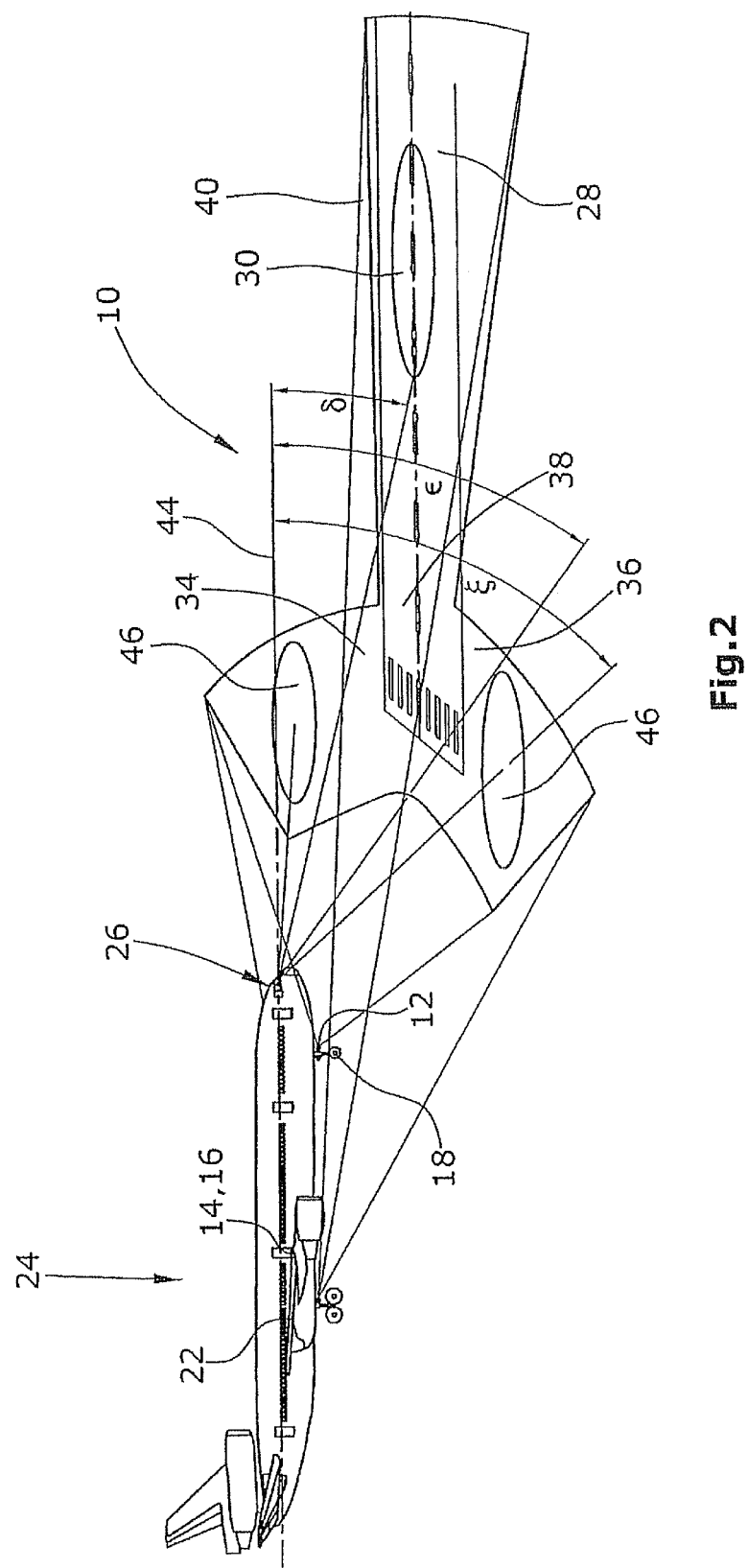
FIG. 2 is a perspective lateral view of the aircraft during landing approach, again with graphical representation of the inventive light distribution.
Figure 3:
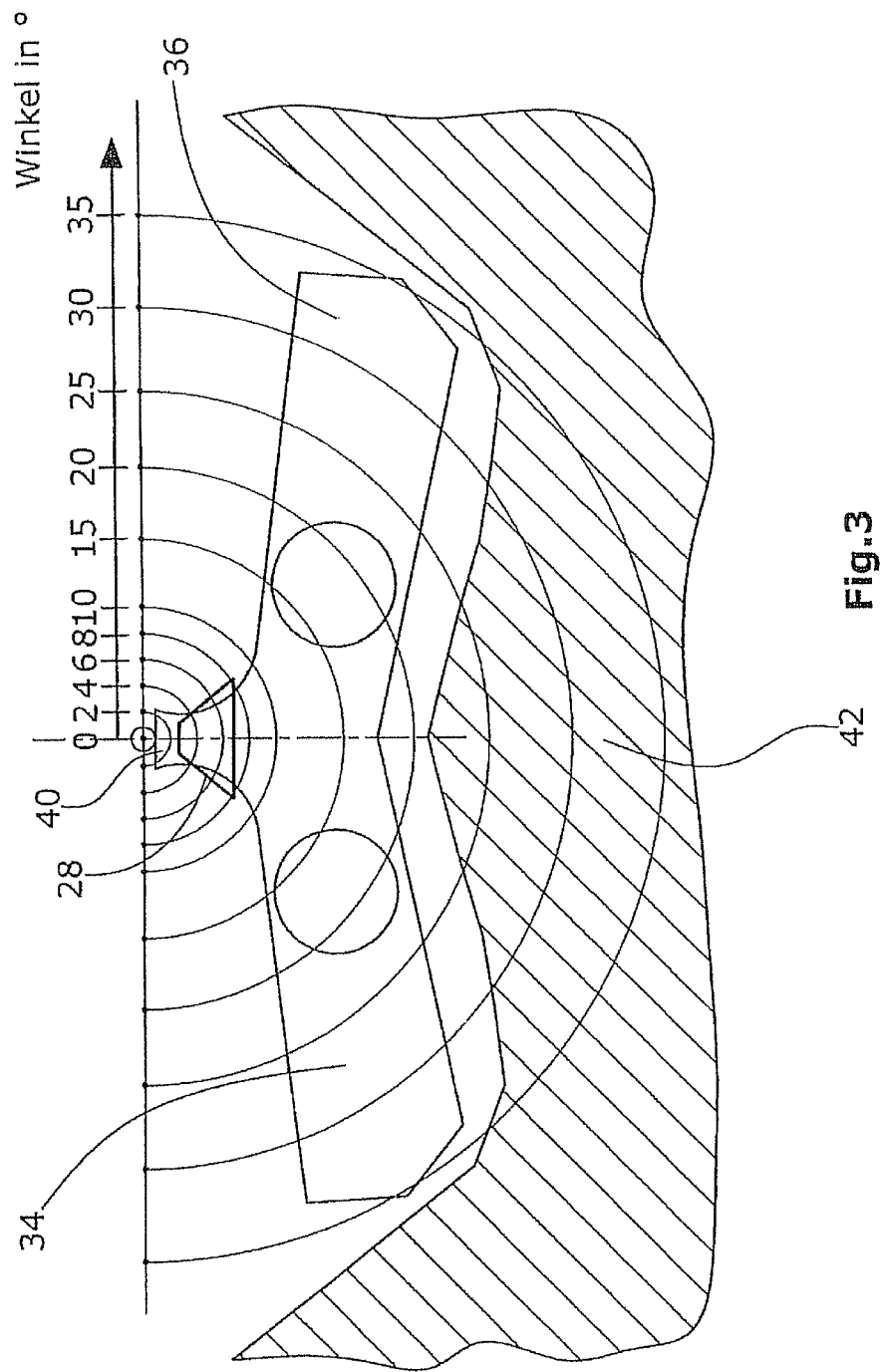
FIG. 3 is a representation of the light distribution area illuminated according to the invention, as viewed by the pilot during landing approach.

While FIG. 1 shows the light distribution in a projection from above, FIG. 2 shows the light distribution in lateral perspective view. FIG. 3 shows the light distribution as seen by the pilot during landing approach.

In FIG. 3, the region where the pilot's field of view is obstructed due to the construction of the cockpit is marked by reference numeral 42.

By the LED landing light arrangement of the invention, there is achieved a landing-light illumination which in plan view and in flight direction corresponds to an inverted "Y" when the aircraft is in its approach position, and which corresponds to the SAE ARP 693 recommendation.

Based on the horizontal plane 44 extending through the eye reference point of the pilot, the angle $\delta$ defines the relationship to the landing zone 30 (see FIG. 2). This angle $\delta$ is implicitly given according to SAE ARP 693 but may actually deviate therefrom in different types of aircraft and different landing sites.

The angle $\epsilon$ (see FIG. 2) relative to the horizontal plane 44 determines the useful forward starting point of the light distribution 10 and, in dependence on the type of aircraft, will be about 15° so that the lower edge of the cockpit windscreen will not cover the illuminated region.

The angle $\zeta$ (see FIG. 2) relative to the horizontal plane 44 defines the angle between the centers of the peripheral zones (lateral regions) 46 of the light distribution 10, in relation to the horizontal plane 44 corresponding to the pilot's peripheral perception without or with only minimum eye or head movement.

The illuminated peripheral zones 46 and the illuminated landing zone 30 are linked by illuminated zones of an intensity higher than that of the general landing-light distribution. This makes it possible for the pilot to let his gaze "wander" between the zones of highest interest without the need of brightness adaptation of the pilot's eyes.

The angle $\beta$ (see FIG. 1) describes the maximal lateral illumination, which is limited, on the one hand, by the lateral window frame of the cockpit and, on the other hand, by the visual perceptibility with respect of reference objects 32 within the peripheral perception of the eye. The peripheral perception of the eye is a function of the illuminance and the aircraft speed and, further, will vary from one person to the next; in such an application, it can amount up to 20%.

The depth of the peripheral zones 46 which are particularly well visible, is described by the center and the angle $\gamma$ and should be at least 30 m in order to allow for an illumination time of the reference objects of about 0.5 seconds at a typical landing speed of 70 m/s. In this manner, the pilot will have sufficient time to perceive the reference objects 32 and to evaluate them for reference.

The angle $\alpha$ (see FIG. 1) is the spreading angle of the lower leg, i.e. of the central region 40 of the Y-shaped spread light distribution 10. This opening angle is provided to compensate for yawing movements of the aircraft 24 in case of crosswind while still realizing an illumination across the whole width of the landing strip 28, notably in the area of the landing zone 30.

The substantially Y-shaped spread light distribution 10 further makes it possible to illuminate the entire width of the landing strip 28 and the side marking lines both in the front and the rear region, and thus will guarantee an excellent impression of the orientation of the aircraft and of the distance of the aircraft from the landing strip.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

The invention claimed is:

1. An LED landing light arrangement for an aircraft, said LED landing light arrangement comprising
 a plurality of LED light sources for arrangement on an aircraft, primarily on the wing roots, on the front edges of the wings and/or on the landing gears,
 said LED light sources are operative to generate, relative to a central axis of the aircraft, a fixed beam of light having light distribution ahead of the aircraft that is spread substantially in a Y-shaped configuration in an obliquely downward direction, said light distribution comprising two converging lateral regions arranged laterally ahead of the aircraft, and a central region running from said converging lateral regions along an extension of said central axis and oriented in a direction away from the aircraft;
 wherein said light distribution spread substantially in a Y-shape extends across a first lateral-angle region (2 times β) between 60° and 100° centered about the central axis of the aircraft, extending a distance from the aircraft of at least 15 m up to maximally 150 m and across a symmetric second lateral-angle region (2 times α) between 0° and 20° centered about the central axis of the aircraft extending a distance from the aircraft of 30 m up to maximally 1000 m.

2. The LED landing light arrangement according to claim 1, wherein the two lateral regions of the light distribution are curved relative to the front end of the fuselage of the aircraft, the central region running from a common central region of the two lateral regions while laterally widening along an extension of the central axis, and in a direction away from the aircraft.

3. The LED landing light arrangement according to claim 1, wherein said light distribution spread substantially in a Y-shape is angled downward relative to a horizontal plane of the aircraft by a height angle of between 5° and 20° and extends within a lateral-angle region of 5° to 20° centered about the central axis of the aircraft.

4. An aircraft comprising an LED landing light arrangement according to claim 1.

* * * * *